United States Patent [19]
Klein et al.

[11] Patent Number: 5,943,398
[45] Date of Patent: Aug. 24, 1999

[54] AUTOMATED MESSAGE-TRANSLATION ARRANGEMENT

[75] Inventors: Robert M. Klein; Michel J. Worford, both of Denver, Colo.

[73] Assignee: Lucent Technologies Inc., Murray Hill, N.J.

[21] Appl. No.: 08/825,874

[22] Filed: Apr. 2, 1997

[51] Int. Cl.⁶ .................................................... H04M 1/64
[52] U.S. Cl. .................................... 379/88.13; 379/88.05; 379/100.13
[58] Field of Search ............................... 379/67.1, 88.05, 379/201, 88.06, 88.13, 88.14, 88.22, 88.25, 93.24, 100.13

[56] References Cited

U.S. PATENT DOCUMENTS

| | | | |
|---|---|---|---|
| 4,916,730 | 4/1990 | Hashimoto | 379/70 |
| 4,996,707 | 2/1991 | O'Malley et al. | 379/100 |
| 5,479,411 | 12/1995 | Klein | 370/110.1 |
| 5,524,137 | 6/1996 | Rhee | 379/67 |
| 5,630,060 | 5/1997 | Tang et al. | 395/200.01 |
| 5,712,901 | 1/1998 | Meermans | 379/88 |
| 5,838,768 | 11/1998 | Sumar et al. | 379/89 |

FOREIGN PATENT DOCUMENTS 9625713  8/1996  WIPO ............................. G06F 17/28

OTHER PUBLICATIONS

Acessing Messages Your Way, Miller et al., AT&T Technology, vol. 10, Spring No. 1, New York, US, Apr. 1995.
Netspeak's Hot Internet Sun Product, Computer Telephony, vol. 5, Issue 8, Aug.1996, pp. 120–124.

*Primary Examiner*—Scott Weaver
*Attorney, Agent, or Firm*—David Volejnicek

[57] ABSTRACT

A messaging system (100) is interfaced with a translation facility (101) so as to provide automated message translation for hearing-impaired and vision-impaired individuals. When a message is deposited (300) in a mailbox (112–113), a daemon process (117) checks (302–304) what translation service the mailbox owner is subscribed to, and then checks (306–312) whether any messages in the mailbox have a translatable component. The daemon process removes (316–318) any such message from the mailbox and sends (320–326) the translatable component to the translation facility with a request to perform the subscribed-to translation—such as voice-to-text or text/fax-to-voice. When the translated component is returned (440), the daemon process checks (442) whether the mailbox owner is subscribed to receive only the translated component or also the original untranslated component, and accordingly either appends (446) the translated component to the message or replaces (444–446) the untranslated component with the translated component in the message. The daemon process then marks (448) the message as translated and deposits (450) the marked message back in the recipient's mailbox for retrieval by the recipient.

11 Claims, 3 Drawing Sheets

AUTOMATED MESSAGE-TRANSLATION ARRANGEMENT

TECHNICAL FIELD

This invention relates to messaging systems, such as voice mail and e-mail systems.

BACKGROUND OF THE INVENTION

Like other people, individuals with impaired vision or hearing find it advantageous to use messaging systems. But if a voice message, or a multimedia message with a voice component, is deposited into the mailbox of a hearing-impaired individual, he or she may find it difficult or impossible to interpret the message. Similarly, if a text or a fax message, or a multimedia message with a text or a fax component, is deposited into the mailbox of a vision-impaired individual, he or she may find it difficult or impossible to interpret the message.

A live voice call which a hearing-impaired person is there to receive can be routed through a public third-party relay service that performs real-time on-line translation of the call between voice on the caller's end and TDD text on the hearing-impaired person's end of the call. (A corresponding type of service between parties to a telephone call who use different languages is provided by the AT&T Language Line service.) But the third-party relay service does nothing for voice calls which are not answered by the hearing-impaired person and result in a voice message being left for the hearing-impaired person, or for messages that are originated as voice messages. Similarly, it does nothing for text and fax messages sent to a vision-impaired person. And even though automatic text-to-speech or fax-to-speech conversion and vice versa—at least in rudimentary form—is already known in the art, there exists no readily available and easy-to-use service mechanism for the interpretation or conversion of messaging-service messages. Consequently, voice messages or message components left in the mailbox of a hearing-impaired individual are often inaccessible, as are fax or text messages or message components left in the mailbox of a vision-impaired individual.

SUMMARY OF THE INVENTION

This invention is directed to solving these and other problems and disadvantages of the prior art. Generally according to the invention, a messaging system is interfaced to a translation facility such that when a message is deposited in a mailbox of the messaging system, the portion of the message that needs translating is automatically sent to the translation facility for translation, and when the translated portion is returned by the translation facility, it is stored in the mailbox as a part of the message from which it came. Thus, for example, when a voice message arrives for a hearing-impaired message recipient, the voice message is automatically translated into text form and made available to the recipient as if it had originally been (i.e. arrived as) a text message. Similarly, when a text or fax message arrives for a vision-impaired message recipient, the text or fax message is automatically translated into voice form and made available to the recipient as if it had originally been a voice message. Preferably, the message is removed from the mailbox while it is being translated, so that the message recipient does not inadvertently access the untranslated message.

Specifically according to the invention, there is provided a messaging method which comprises the steps of sending a translatable portion of a message to a translating facility for translation, in response to the message which includes the translatable portion being stored in a mailbox of a messaging system, and then storing the translated portion in that mailbox as a part of the message, in response to receipt of the translated portion from the translation facility. Also according to the invention, there is provided an apparatus which effects the method steps. The apparatus preferably includes an effector—any entity that effects the corresponding step, unlike a means—for each step. Furthermore, there is preferably provided a computer-readable medium containing software which, when executed in a computer, causes the computer to perform the method steps.

These and other advantages and features of the invention will become more apparent from the following description of an illustrative embodiment of the invention taken together with the drawing.

DETAILED DESCRIPTION

Figure 1:
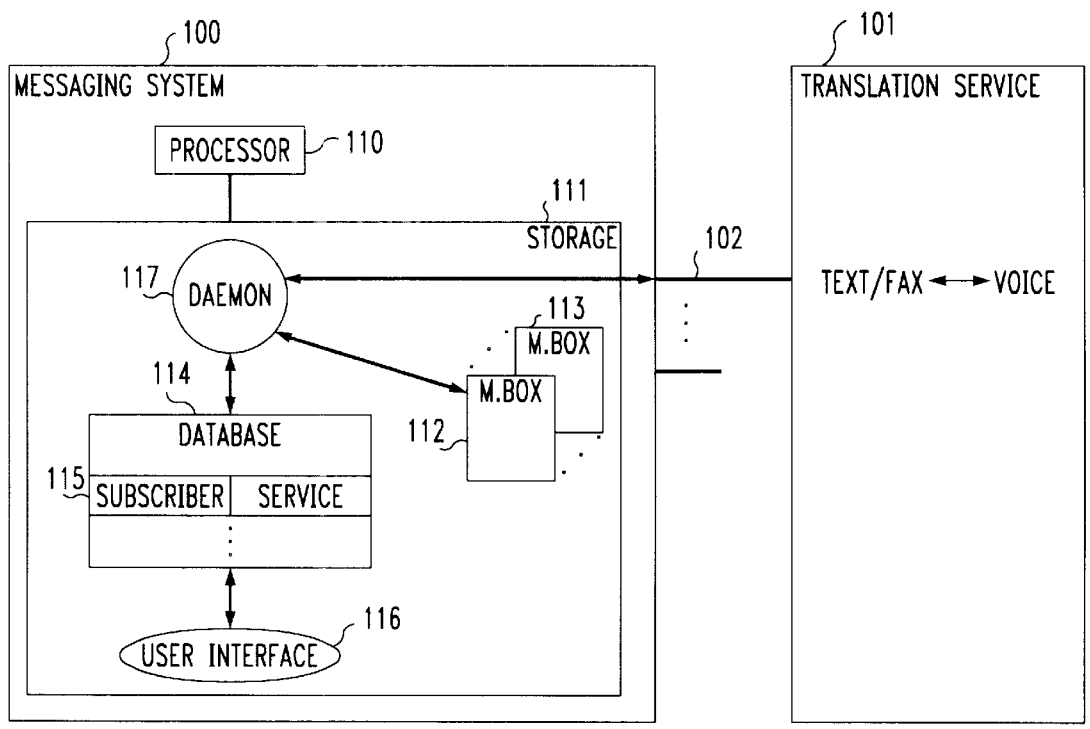
FIG. 1 is a block diagram of a messaging system that includes an illustrative embodiment of the invention.

FIG. 1 shows a messaging system that includes an illustrative automatic message translation arrangement configured according to the invention. The arrangement comprises a messaging system 100 and a translation service 101 interconnected by a communications medium 102. Messaging system 100 is illustratively a multimedia messaging system, such as the Intuity® messaging system of Lucent Technologies Inc. It is a stored-program controlled apparatus, comprising a processor 110 for executing control programs stored in a storage 111 to provide subscribers with multimedia messaging services. Storage 111 may be any computer-readable medium. Storage 111 also includes a message mailbox 112–113 for each subscriber/message recipient. As described so far, messaging system 100 is conventional.

According to the invention, control programs stored in storage 111 for execution by processor 110 include a program for implementing a daemon process 117, and a database 114 for use by daemon process 117. A daemon is an agent program not associated with any users, which continuously operates on a server and provides resources to clients. It is a background process used to do system-wide functions. If system 100 is the Intuity system, daemon process 117 may be a "trusted server", which is a process that has special privileges in the Intuity system which entitle it to access any mailbox. Database 114 holds one or more entries 115 each one of which identifies a subscriber who has subscribed to translation services provided by the arrangement of FIG. 1, and also identifies the particular translation service or services that the subscriber has subscribed to. For the purpose of enabling either the subscribers or an administrator of messaging system 100 to update entries 115, database 114 has associated therewith a user interface 116. Preferably, user interface 116 is a graphical user interface, such as a Word Wide Web page. In the case of messaging system 100 being the Intuity messaging system, user interface 116 may be an extension of the Intuity Message Manager of Lucent Technologies Inc.

Alternatively, elements 114–117 can be implemented externally to messaging system 100 on an adjunct processor which communicates with system 100 via an application program interface (API), such as the Intuity messaging API (IMAPI).

Communications medium 102 can take many forms. For example, it may be a telephone link, a LAN/WAN data network (f.ex., TCP/IP datagram service), or the Internet (f.ex., SMTP/POP socket protocol). Connection between medium 102 and messaging system 100 may be effected in any suitable way. For example, if system 100 is the Intuity messaging system, and medium 102 is the Internet, the connection may be made via the Intuity Gate Net interface of Lucent Technologies Inc. Translation service 101 can also take many forms. For example, it may comprise one or more human agents each equipped with a telephone and either a data terminal or a computer, or it may comprise a computer executing text/fax-to-speech and speech-to-text/fax conversion programs. Illustratively, translation service 101 may be a subscriber of messaging system 100 and have its own mailboxes therein—one for message retrieval and another for translated message deposit—which it may access via a GUI such as the Lucent Intuity Message Manager.

Figure 2:
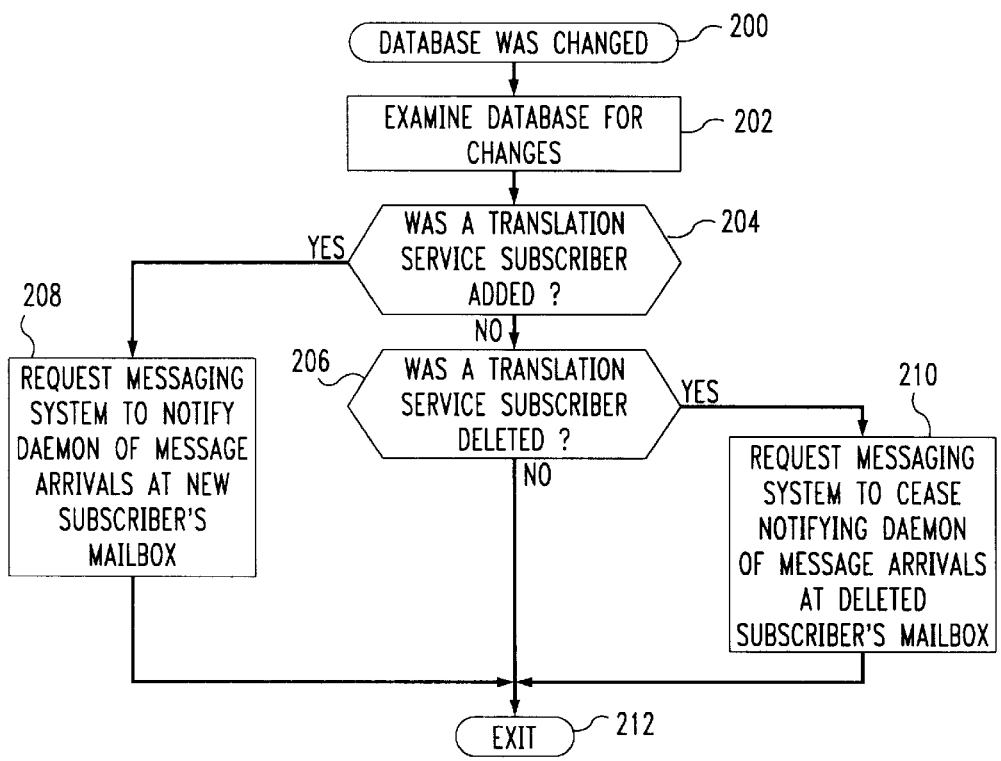
FIGS. 2–4 are functional flow diagrams of message-translation-related operations performed by the system of FIG. 1.
Figure 3:
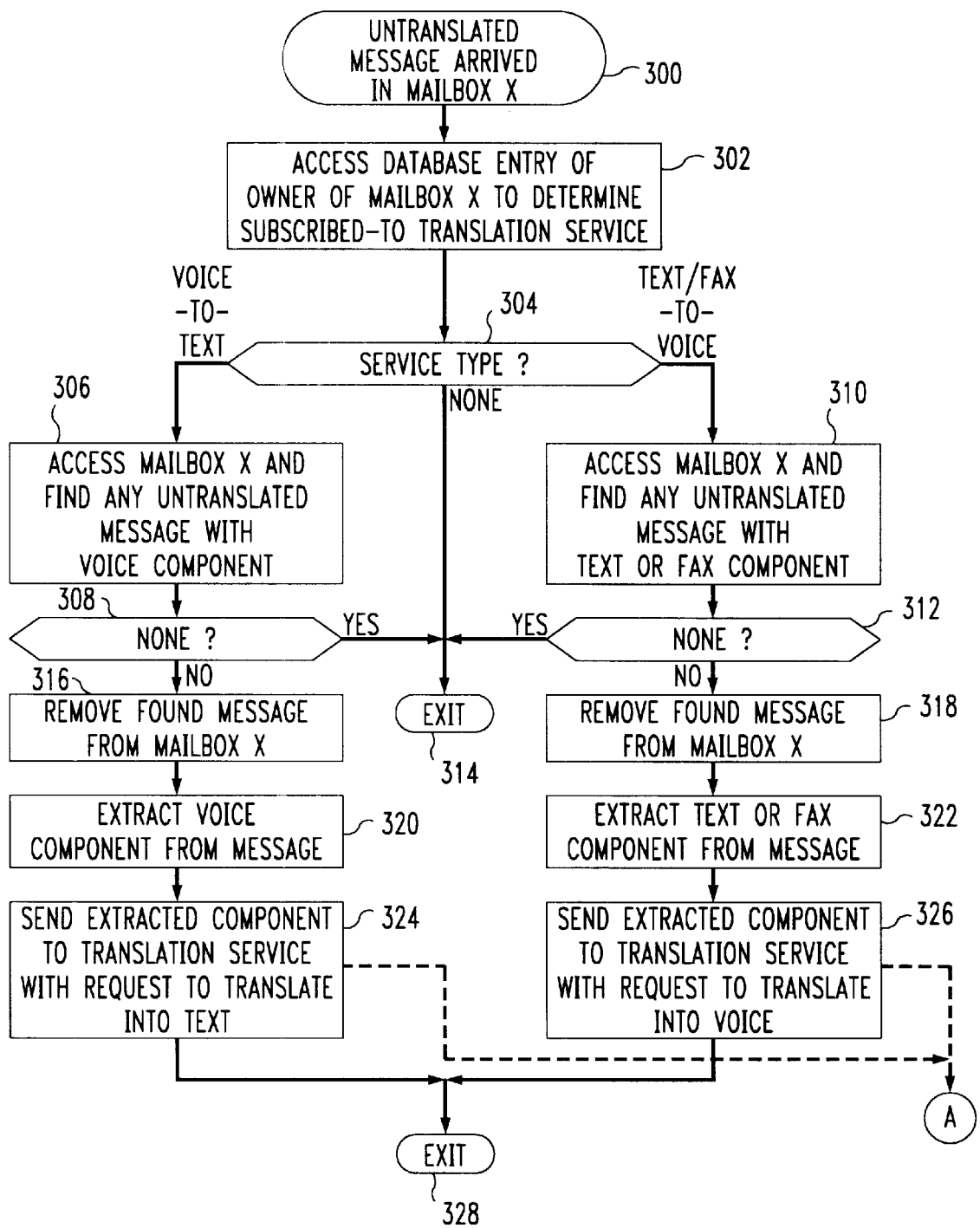
Figure 4:
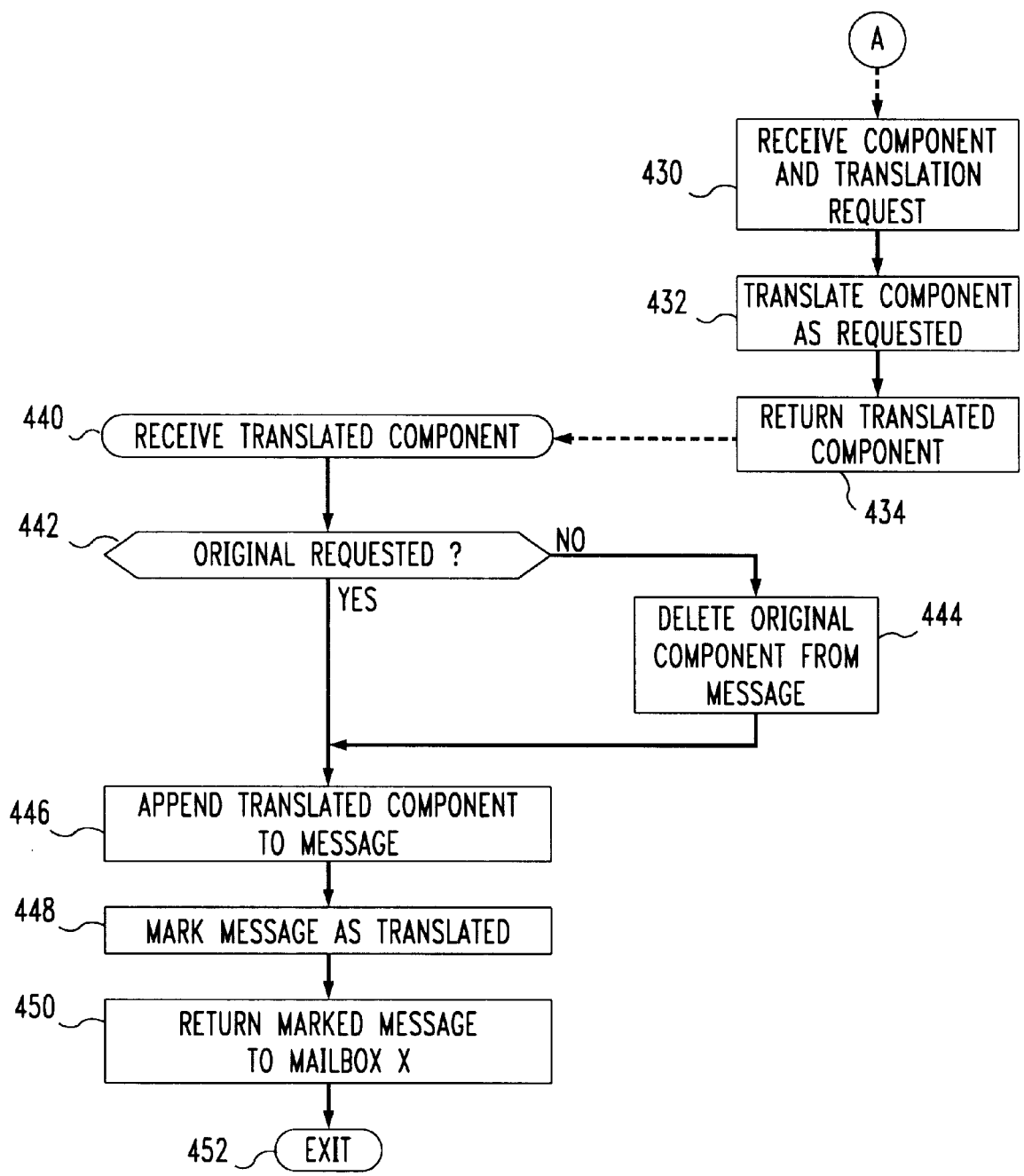

The functionality of the arrangement of FIG. 1 in effecting translations is flowcharted in FIGS. 2–4.

When a subscriber of messaging system 100 makes a change to the contents of database 114, daemon process 117 is notified, at step 200 of FIG. 2. Daemon process 117 examines contents of database 114 to determine what change was made, at step 202. If a new subscriber has subscribed to translation service 101, as determined at step 204, daemon process 117 requests messaging system 100 to notify daemon process 117 of any message arrivals at the new subscriber's mailbox 112, at step 206. If a subscriber has unsubscribed to translation service 101, as determined at step 208, daemon process 117 requests messaging system 100 to cease notifying daemon process 117 of message arrivals to the deleted subscriber's mailbox 112, at step 210. If a translation service subscriber has neither been added nor been deleted, as determined at step 208, or following step 206 or 210, daemon process 117 exits execution, at step 212.

When an untranslated message is received by messaging system 100 for a subscriber for whom daemon process 117 has requested to be notified of arriving messages and is stored in the subscriber's mailbox X, messaging system 100 notifies daemon process 117, at step 300 of FIG. 3. Daemon process 117 then accesses database entry 115 of the subscriber who owns mailbox X in database 114 to determine therefrom the type of translation service that the subscriber is subscribed to, at step 302. If it is determined, at step 304, that the subscriber is not subscribed to any translation service, daemon process 117 exits execution, at step 314. If it is determined at step 304 that the subscriber is subscribed to voice-to-text translation service, daemon process 117 accesses the subscriber's mailbox X and searches for any message with a voice component, at step 306. If it is determined at step 304 that the subscriber is subscribed to text/fax-to-voice translation service, daemon process 117 accesses mailbox X and searches for any message with a text or a fax component, at step 310. A message header component with a text subject line (or other text information) is illustratively considered to be a text component for this purpose. If no message having a searched-for component is found, as determined at step 308 or 312, daemon process 117 exists execution, at step 314.

If a message with a searched-for component is found, daemon process 117 removes that message from mailbox X, at step 316 or 318, and extracts from that message the searched-for component, at step 320 or 322. Daemon process 117 then sends the extracted component to translation service 101 along with a request to translate the component in the manner subscribed to by the owner of mailbox X, at step 324 or 326. If translation service 101 is a subscriber of messaging system 100, sending the component and translation request to translation service 101 may involve storing a message to that effect in a mailbox belonging to translation service 101. Daemon process then exits execution, at step 328.

When translation service 101 receives the translation request and the message component to be translated, at step 430 of FIG. 4, it translates the component as requested—either from voice to text or from text/fax to voice—at step 432, and then returns the translated component to daemon process 117, at step 434.

The translated component may be received by messaging system 100 for daemon process 117—for example, in a buffer or a mailbox dedicated to daemon process 117, or in a mailbox belonging to translation service 101 if service 101 is a subscriber of system 100. In that case, messaging system 100 notifies daemon process 117 of the receipt of the translated component, at step 440 of FIG. 4. Otherwise, daemon process 117 may receive the translated component directly, at step 440. In either case, upon receipt of the translated component at step 440, daemon process 117 checks in entry 115 of database 114 on details of the translation service subscribed to by the owner of mailbox X to determine, at step 442, whether that subscriber has requested to receive both the translated component and the original of that component, or only the translated component. If the subscriber has elected to receive only the translated component, daemon process 117 deletes the original component from the message that it had obtained at step 316 or 318 of FIG. 3, at step 444 of FIG. 4. Following step 444, or if the subscriber has elected to receive the original as well as the translated component, daemon process 117 appends the translated component to the message that it had obtained at step 216 or 218, at step 446. Daemon process 117 then marks the message as translated, at step 448, so that messaging system 100 will not inform daemon process 117 at step 300 of its arrival at the subscriber's mailbox. Daemon process 117 then returns the marked message back to mailbox X, at step 450, and then exits execution, at step 452. The mailbox owner can now access and retrieve the message including the translated component in a conventional manner.

Of course, various changes and modifications to the illustrative embodiment described above will be apparent to those skilled in the art. For example, the invention can be employed equally well for translating messages or their components between any media, or from one language to another. Or, it can be applied to e-mail systems, fax systems, and other messaging systems, f.ex., using the IMAP4 protocol between the e-mail system and the daemon process. Also, messages can be operated on based on factors other than the media type (f.ex., the message source). Furthermore, the same mechanism could also be used for auto-forwarding of messages. For example, a voice message translated into fax text form can be automatically delivered to the recipient's fax machine, thereby eliminating the need for the recipient to access the messaging system. Such changes and modifications can be made without departing from the spirit and the scope of the invention and without diminishing its attendant advantages. It is therefore intended that such changes and modifications be covered by the following claims.

The invention claimed is:

1. A messaging method comprising the steps of:

in response to a message having a translatable portion being stored in a mailbox of a messaging system, automatically sending the translatable portion to a translating facility for translation; and in response to receiving a translated said translatable portion from the translating facility, automatically storing the translated portion as a part of the message in same said mailbox.

2. The method of claim 1 wherein:

the step of storing comprises the step of storing the translated portion in place of the translatable portion as a part of the message in same said mailbox.

3. The method of claim 1 wherein:

the step of storing comprises the step of storing the translated portion in addition to the translatable portion as a part of the message in same said mailbox.

4. The method of claim 1 wherein:

the step of sending comprises the steps of determining which one of a plurality of available translations corresponds to the mailbox, selecting a portion of the message that is translatable according to the corresponding translation, and sending the selected translatable portion and an indication of the corresponding translation to the translating facility; and the step of storing comprises the step of in response to receiving from the translating facility the sent translatable portion translated according to the corresponding translation, storing the translated portion in the mailbox as a part of the message.

5. The method of claim 1 wherein:

the step of sending comprises the steps of in response to the message being stored in the mailbox of a recipient of the message, removing the message from the mailbox, and sending the translatable portion of the removed message to the translation facility; and the step of storing comprises the steps of including the translated portion in the removed message, and storing the message including the translated portion in the mailbox for retrieval by the recipient.

6. A messaging method comprising the steps of:

in response to a message being deposited in a mailbox of a recipient of the message, automatically determining which translation service of a plurality of available translation services the recipient is subscribed to;

in response to the determination, automatically determining whether a message stored in the recipient's mailbox has a component translatable via the subscribed-to translation service;

in response to determining that a message in the recipient's mailbox has a translatable component, automatically removing the message from the recipient's mailbox;

automatically extracting the translatable component from the removed message;

automatically sending the extracted translatable component with a request to perform the subscribed-to translation service to a translation facility;

in response to receipt from the translation facility of a translated said translatable component, automatically including the translated component in the removed message; and automatically depositing the removed message with the translated component in the mailbox of the recipient.

7. The method of claim 6 wherein:

the step of including comprises the steps of determining whether the recipient wants to receive an untranslated said extracted component, in response to determining that the recipient wants to receive the untranslated extracted component, including the untranslated extracted component in the removed message, and in response to determining that the recipient does not want to receive the untranslated extracted component, deleting the untranslated extracted component from the removed message.

8. An apparatus comprising a processor that executes instructions to perform the method of claim 1 or 2 or 3 or 4 or 5 or 6 or 7.

9. A computer-readable medium containing software which, when executed in a computer, causes the computer to perform the steps of claim 1 or 2 or 3 or 4 or 5 or 6 or 7.

10. A messaging system comprising:

a mailbox for storing messages;

means responsive to storing of a message having a translatable portion in the mailbox, for sending the translatable portion to a translating facility for translation; and means responsive to receipt from the translating facility of a translated said translatable portion, for storing the translated portion as a part of the message in same said mailbox.

11. An apparatus for use with a mailbox for storing messages, comprising:

an effector of automatically sending a translatable portion of a message to a translating facility for translation, in response to the message having the translatable portion being stored in the mailbox; and an effector of automatically storing a translated said translatable portion as a part of the message in same said mailbox, in response to receipt of the translated translatable portion from the translating facility.

* * * * *